US006496766B1

(12) United States Patent
Bernold et al.

(10) Patent No.: US 6,496,766 B1
(45) Date of Patent: Dec. 17, 2002

(54) CRANE MONITORING AND DATA RETRIEVAL SYSTEMS AND METHOD

(75) Inventors: Leonhard E. Bernold, Cary, NC (US); Steven J. Lorenc, Apex, NC (US); Scott D. Elliott, Holly Springs, NC (US); Michael S. Cobb, Hillsborough, NC (US); Anders R. Green, Apex, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/914,173
(22) PCT Filed: Mar. 1, 2000
(86) PCT No.: PCT/US00/05376
§ 371 (c)(1),
(2), (4) Date: Apr. 4, 2002
(87) PCT Pub. No.: WO00/52627
PCT Pub. Date: Sep. 8, 2000

Related U.S. Application Data (60) Provisional application No. 60/122,322, filed on Mar. 1, 1999.
(51) Int. Cl.[7] .................................................. G06G 7/76
(52) U.S. Cl. ........................ 701/50; 340/685; 212/276
(58) Field of Search ........................... 701/50; 340/685, 340/684; 212/276, 277, 280

(56) References Cited

U.S. PATENT DOCUMENTS 3,740,534 A    6/1973   Kezer et al.
4,063,649 A    12/1977  Hubbard et al.
4,178,591 A    12/1979  Geppert
4,185,280 A    1/1980   Wilhelm
5,550,733 A  * 8/1996   Yun et al. .................... 212/272

FOREIGN PATENT DOCUMENTS

WO          00/52627    *  8/2000   .......... G06F/19/00

* cited by examiner

*Primary Examiner*—William A. Cuchlinski, Jr.
*Assistant Examiner*—Olga Hernandez
(74) *Attorney, Agent, or Firm*—Jenkins & Wilson, P.A.

(57) ABSTRACT

A crane monitoring system and method is characterized by a plurality of sensors mounted to a crane which communicate data to an on-board control unit. The control unit is characterized by having "black box" functionality. A tip switch is mounted in parallel relation to the vertical portion of a hoist cable below the boom tip. The control unit processes and stores input data from the sensors which will indicate unsafe crane conditions, defined as alarm events such as dragging and extrication events. Each stored event has a time and date stamp. Upon detection of an alarm event, the control unit logs data from the sensors into a non-volatile memory, along with the data from a period of time prior to the alarm event. Data is stored continuously until the alarm event clears. Additional data is stored for a period of time after the conclusion of the alarm event. This results in a discrete event log residing on the non-volatile memory which can subsequently be accessed by authorized personnel for analysis and identification of the crane operator who caused the alarm event.

24 Claims, 7 Drawing Sheets

CRANE MONITORING AND DATA RETRIEVAL SYSTEMS AND METHOD

This application claims the benefit of provisional application 60/122,322 filed Mar. 1, 1999.

TECHNICAL FIELD

The present invention is generally directed to the detection and retrospective analysis of the critical events associated with non-compliant or dangerous operations carried out by operators of cranes. More particularly, the present invention is directed to a system and method for automatically collecting, processing and storing data representative of crane operating conditions causing such non-compliant or dangerous operations, for later retrieval and analysis.

BACKGROUND ART

Lifting and positioning of heavy objects is one of the basic tasks in construction. A wide variety of types of cranes, derricks and other hoisting equipment, both mobile and permanently installed, are used to carry out specific lifting and positioning operations. In the past, safe crane operations depended on operator training, good maintenance, effective planning, and supervision. Safety is considered to be among the most critical issues involved in the success of any lift operation. However, crane accidents still occur. Such accidents often involve serious personal injury or death and costly destruction of property, as well as costly damage to the crane itself such as crane boom bending and turret drive gear failure.

Studies have shown that crane operators often expose cranes to frequent uncharacteristic loading conditions, such as the dragging of waste buckets and the extrication or extraction of piles, tree stumps and lodged debris. The culpability of crane operators is often attributed to lack of sufficient information regarding crane capacities, poor planning or miscalculations regarding anticipated load conditions, poor decision-making during crane operation, and simply carelessness. Dragging and extrication events constitute overload conditions and can cause several types of failure modes and resulting damage, such as the creation of grooves on sheave pulleys, plastic deformation and even complete failure of the boom, and breakage of gear teeth in the turret drive. Grooving and gear teeth breakage are directly related to hoist cable load vectors with significant components off the normal axis and are induced during the dragging of loads. Boom deformation and failure can result from overloading the boom by exceeding safe loading capacities for the different boom angles and boom extensions specified by capacity charts provided by crane manufacturers. Deformation can also result from the cumulative effect of static and dynamic forces that occur during the abrupt extrication events.

In order to assist the crane operator and secure the crane from damages, overload protection systems based on hydraulic pressure limits are provided as standard in many new cranes. These overload protection systems, however, do not secure the crane against dragging or extrication events. In addition, operators often choose to ignore the warning signals from the protection system and consequently operate cranes at dangerous hydraulic pressure levels.

Presently, no adequate means exist for detecting the occurrence of hazardous dragging and extrication events or for recording such events. Accordingly, a need exists for a crane monitoring system capable of detecting such events, providing an audible warning to the crane operator of detected event, and automatically storing electronic data descriptive of the actual event for later analysis by skilled investigators.

DISCLOSURE OF THE INVENTION

The crane monitoring system and method according the present invention can generally be characterized by a plurality of sensors mounted to a crane which communicate data to an on-board control unit. The control unit is characterized by having "black box" functionality. In general, the control unit processes and stores input data which will indicate either normal or unsafe crane conditions. Unsafe crane conditions are defined as alarm events such as dragging and extrication events. Each stored event has a time and date stamp indicating the time at which the event occurred and the time when the event is cleared. The control unit stores the latest event in a record format until the device memory is filled. The control unit rolls over the data after the memory is filled, erasing the oldest record in order to store the most recent record.

The input data from sensors is digitized and stored continuously. The processing circuitry of the control unit compares the input data to a predetermined set of parameters to detect whether an alarm event has occurred. Upon detection of an alarm condition, a horn output is activated. The control unit then logs data from the sensors into a non-volatile memory, along with the data from a period of time such as ten seconds prior to the alarm. Data is stored continuously until the alarm event clears and then, for a period of time such as thirty seconds, additional data is stored after the conclusion of the alarm event. This results in a discrete event log residing on the non-volatile memory which can subsequently be accessed by authorized personnel for analysis and identification of the crane operator who caused the alarm event. The event log can be downloaded to a PC in comma delimited format so that it can be used by any common spreadsheet program.

According to one embodiment of the present invention, a method is provided for monitoring critical operations of a crane, and for safely and automatically storing records of alarm events arising from such operations the method comprises the following steps. A plurality of input channels are provided, over which crane condition signals can be transferred from sensors mounted to a crane. Each crane condition signal is generated by one of the sensors, and includes a value representative of a specific measurement or condition of the crane during operation thereof. A data set is continuously sampled at a predetermined sampling rate during operation of the crane by communicating with the input channels. Each sampled data set includes the value detected for each crane condition signal at the time of sampling, and also includes time and date information corresponding to the respective time and date of sampling. Given the significant transfer speed of electrical signals and the processing speed of modem digital processing devices, the time of sampling substantially corresponds to the time at which the crane condition occurred.

Each data set sampled is stored into a non-volatile memory device. For each data set sampled, the values of the crane condition signals are compared to a set of predetermined safe operating parameters to determine whether an alarm event has occurred. The alarm event is defined when one or more of the values of the sampled crane condition signals falls outside a corresponding one or more of the safe operating parameters. If an alarm event has occurred, the values of the crane condition signals are compared to the safe operating parameters to determine whether the alarm event has ceased. The cessation of the alarm event is defined when one or more of the values of the sampled crane condition signals falls back inside a corresponding one or more of the safe operating parameters. If an alarm event has occurred, an event log is generated for the alarm event by storing, into a separately addressed location of the non-volatile memory device, all data sets sampled over a period of event history. The period of event history is defined as starting at a predetermined number of seconds prior to the occurrence of the alarm event and ending at a predetermined number of seconds after the cessation of the alarm event.

According to another embodiment of the present invention, the method of crane monitoring includes mounting the plurality of sensors to a crane, and securely mounting a control unit to the crane. Control circuitry is provided within the control unit. The plurality of input channels are provided to establish communication from the sensors to the control circuitry. The control circuitry is programmed to perform the crane monitoring and data storage functions described hereinabove, including sampling the data set, storing the data set into the non-volatile memory, detecting the occurrence of an alarm event, and generating an event log by storing all data sets sampled over the period of event history.

According to a further aspect of the present invention, a crane monitoring system is provided. The crane monitoring system comprises a plurality of sensors as described hereinabove, operatively mounted to a crane and adapted to monitor a plurality of operating conditions of the crane. A crane monitoring control unit is securely mounted to the crane. A non-volatile memory unit is operatively disposed within the control unit and communicates with the digital processing circuitry. The digital processing circuitry is adapted to execute a set of crane monitoring instructions. The instructions include continuously sampling the data, writing the sampled data set into the non-volatile memory, comparing the crane condition signals to a set of predetermined safe operating parameters, detecting the occurrence and subsequent cessation of an alarm event, generating a discrete event log, and writing the event log into the non-volatile memory.

According to a still further aspect of the present invention, a crane equipped with a crane data acquisition system is provided. The crane comprises a crane support section including a plurality of operative crane components mounted thereto. The crane components include a hydraulically actuated turret assembly rotatable about a vertical axis, and a boom assembly pivotably mounted to the turret assembly and rotatable about a horizontal axis. The boom assembly includes a boom tip disposed at a distal end of the boom assembly. The crane components also include a hydraulically actuated main lift cylinder pivotably interconnected between the crane support section and the boom assembly, a winch assembly, and a cable windable about a drum within winch assembly. The cable extends along the length of the boom assembly and downwardly toward the ground below the boom tip. The crane also includes a crane operator section adapted for use by a crane operator.

A plurality of sensors are operatively mounted to a crane and adapted to monitor a plurality of operating conditions of the crane. Each sensor is operative to generate an electrical crane condition signal representative of one of the monitored crane operating conditions, and to send the crane condition signal over a communication line. The sensors include a tip switch mounted proximate to the boom tip and suspended therefrom in parallel relation to the cable. The tip switch is adapted to detect whether the cable is operating at an excessive angle of inclination. In addition, a pair of main lift cylinder pressure transducers are operatively mounted to the main lift cylinder and adapted to measure hydraulic pressure variations experienced by the main lift cylinder. A pair of turret drive pressure transducers are operatively mounted to the turret assembly and adapted to measure hydraulic pressure developed by the turret assembly during respective left and right rotations of the turret assembly. An accelerometer is operatively mounted to the boom assembly and adapted to measure accelerations and decelerations experienced by the boom assembly.

The crane further comprises a crane monitoring control unit securably mounted to the crane operator section, and which communicates with the plurality of sensors. The crane monitoring control unit includes digital processing circuitry for sampling and processing the crane condition signals, identifying the occurrence of an unsafe crane condition based on a comparison of the crane condition signals against predetermined safe operating parameters, and generating and storing an event log indicative of crane operations causing the unsafe crane condition. The event log includes all crane condition signals sampled over a period of time starting at a predetermined number of seconds preceding the occurrence of the unsafe crane condition and ending at a predetermined number of seconds after a conclusion of the unsafe crane condition.

Accordingly, it is an object of the present invention to provide a system and method for monitoring the conditions under which a crane is operating.

It is a further object of the present invention to provide a system and method for detecting an alarm event during which crane operating conditions have exceeded specified limits.

It is another object of the present invention to provide a system and method for creating an event log containing sensor data and other information describing the circumstances surrounding a crane operating conditions alarm event, and storing the event log for later retrieval and analysis by a device or devices external to the system.

Some of the objects of the invention having been stated hereinabove, other objects will become evident as the description proceeds when taken in connection with the accompanying drawings as best described hereinbelow.

DETAILED DESCRIPTION OF THE INVENTION

Figure 1:
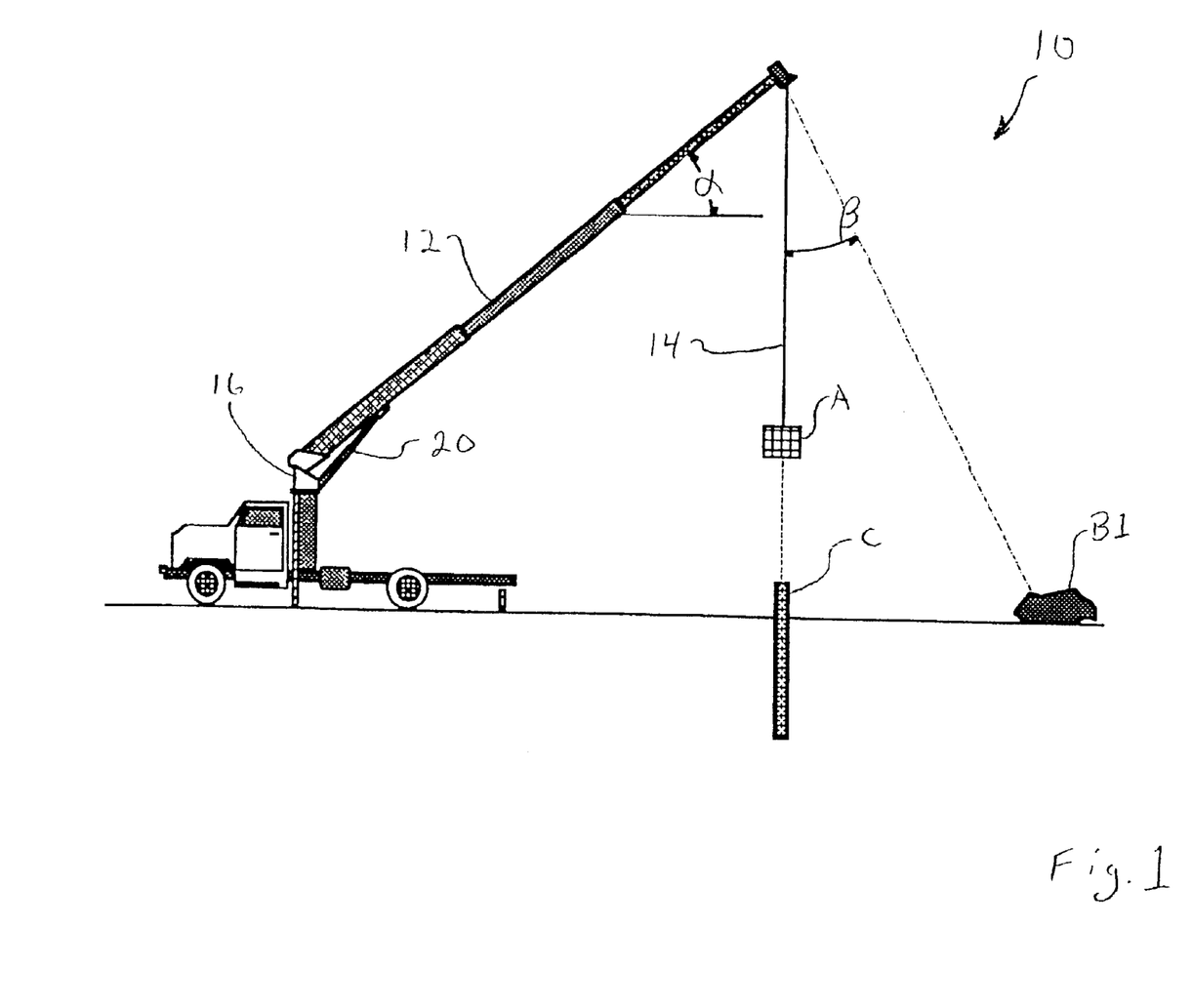
FIG. 1 is a side elevation view of a typical crane operating under three different load cases.
Figure 2:
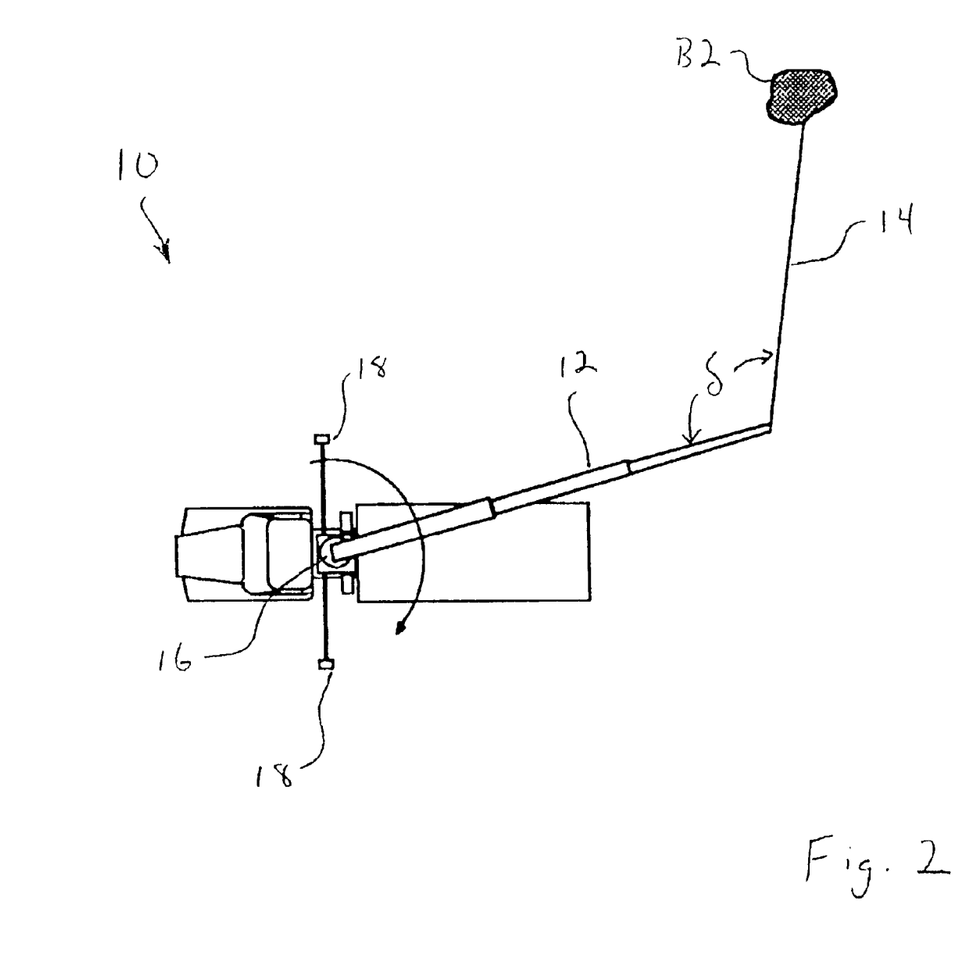
FIG. 2 is a top plan view of the crane of FIG. 1 operating under a fourth load case.

Referring to FIGS. 1 and 2, an exemplary crane is generally designated 10, and includes a boom 12, a hoist cable 14, a rotating turret 16, a pair of outriggers 18, and a boom lift cylinder 20. The present invention is primarily concerned with three modes of operation of crane 10 and similar hoisting apparatus. The first is the normal mode of operation involving the lifting of a load A in an entirely or substantially vertical direction while boom 12 is positioned at an acceptable boom angle $\alpha$. The lifting of load A is an example of the intended mode of operation of crane 10. The crane manufacturer specifies and provides many of the parameters critical to this type of lifting, such as hoist cable strength, available pull at the boom winch, structural strength of boom connections, stability against overturning, and structural strength of boom elements. These parameters can be correlated with the maximum loading capacity of crane 10 at various boom angles $\alpha$.

The second mode of operation involves the "dragging" of a load B1 or B2, which results in a non-vertical cable vector defined by a drag angle $\beta$. Load B1 is dragged from locations directly in front of boom 12, while load B2 is dragged from locations that are perpendicular to either side of boom 12. The dragging of load B1 results in abnormal forces in boom 12. The dragging of load B2 results in abnormal forces in the drive mechanism of turret 16 as well as in boom 12. The dragging of load B2 can be accomplished by operating hoist cable 14 at an angle $\delta$ with respect to boom 12, or by rotating turret 16 and thus rotating boom 12 as well. Charts provided by manufacturers to indicate maximum load ratings, to indicate maximum boom extensions for various boom angles, to compute allowable stresses of the cross-sections of boom segments, and the like cannot be utilized to depict maximum loads when non-vertical load vectors become relevant. The use of turret 16 to engage in dragging can cause a significant buildup of stress in the teeth of the gears of the turret drive and therefore cause serious damage to the turret drive. This is because the turret drive is designed to resist only the forces produced by the increase in acceleration of a hoisted load during rotation of crane 10.

The third mode of operation involves the abrupt extrication of load C, which is a temporarily stuck object. This type of operation involves a number of predominant dynamic factors, and can result in an overloading of boom lift cylinder 20 and rapid accelerations and decelerations in boom 12. The principal dynamic factor is the acceleration of the mass of the object to be extricated, such as load C. Changes in acceleration of load C as it is being pulled out of the ground tend to "rocket" the force applied to hoist cable 14, submitting the whole crane system to very high stress levels during that time. This causes boom 12, which is initially deflected downwards by load C, to cyclically deform in opposite directions until the system regains static equilibrium. The kinetic energy of the system results in an oscillatory action that proceeds until it is dampened out, or if too high, results in the breaking of boom 12 or at least some of its supports or connections.

Because of the speed in which the critical dynamic forces in boom 12 develop, it is extremely difficult to warn the crane operator in order to prevent this lifting condition. Until load C releases and starts moving in the direction of hoist cable 14 (e.g., the breaking of the root of a tree), the forces in hoist cable 14 behave normally. It is unlikely that a critical loading condition caused by extrication occurs at the first attempt of pulling on a stuck object. More probably, crews working with crane begin with an object that is relatively easy to extricate, such as one having a relatively small mass or one that is only partially stuck. After achieving some degree of success with easy extrications however, crane operators tend to become bolder and more confident in the ability of crane 10 to carry out extricating movements. The sensors technologies provided by the present invention are designed with this scenario in mind. Because it might be impossible to automatically detect a critical extrication event early enough to completely prevent it, warnings can be given after the supposedly first "non-critical" attempt. Even though such warnings might come after an occurrence, it can deter the crane operator and crews from undertaking a second and possibly injurious attempt.

It is thus seen that the modes of operation utilized to manipulate loads B1, B2 and C, i.e., dragging and extrication events, are common and can result in extreme stresses in the cross-section of boom 12 and other components of crane 10. This is especially true because dragging and extrication events not only produce cumulative static forces, but also dynamic forces for which crane is not designed.

Figure 3:
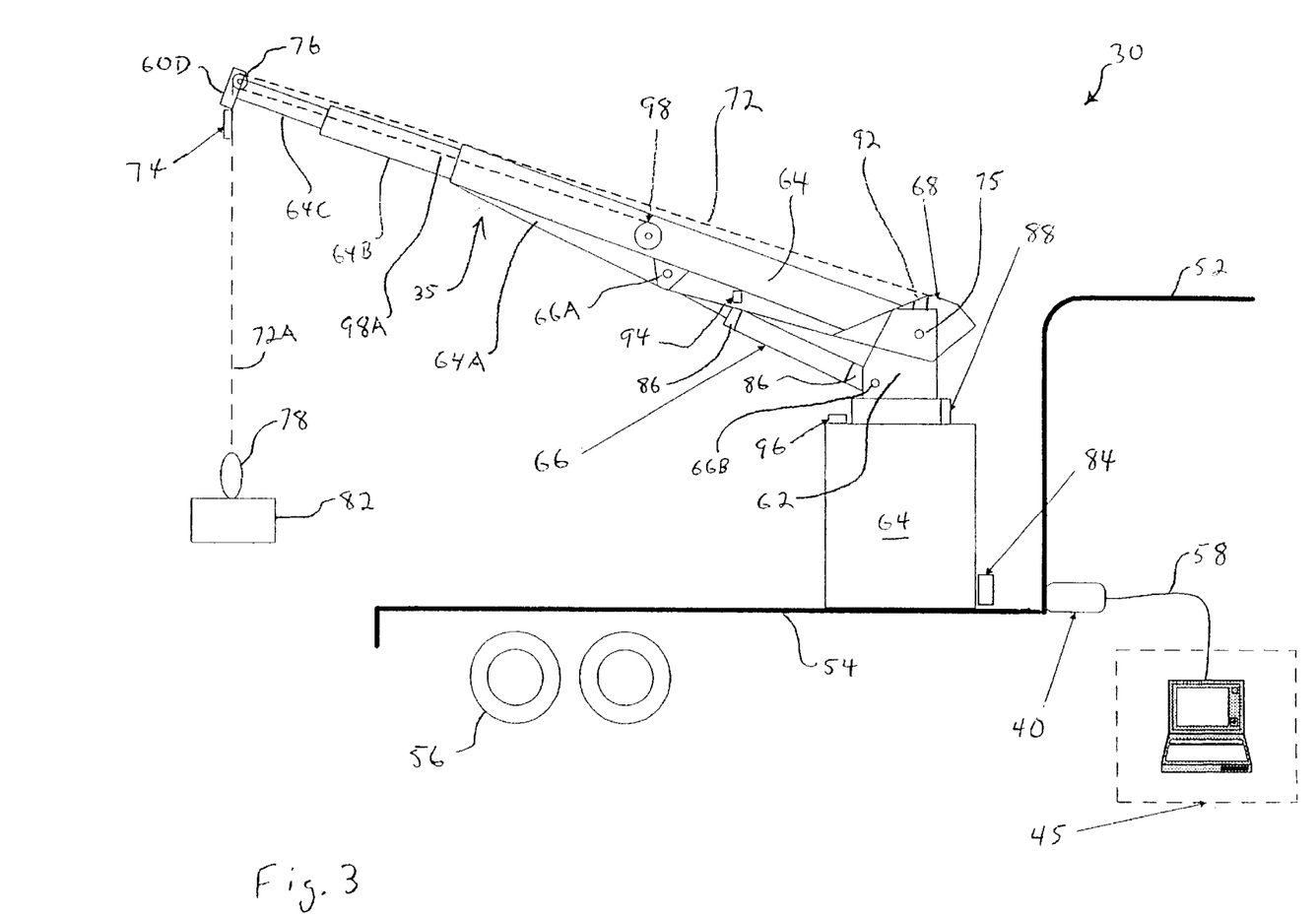
FIG. 3 is a side elevation view illustrating the overall structural features of a crane monitoring system according to the present invention.

Referring to FIG. 3, a crane monitoring system generally designated 30 is provided in accordance with the present invention. Crane monitoring system 30 includes a crane generally designated 35, a crane monitoring control unit generally designated 40, and a computing device such as a PC generally designated 45. By way of example, crane 35 illustrated in FIG. 3 is a mobile, truck-mounted type that generally includes a cab portion (partially represented by reference numeral 52) in which a crane operator resides, a bed portion (partially represented by reference numeral 54) on which the primary structural and operating components of crane 35 are mounted, and running gear (partially represented by reference numeral 56) for mobility of crane 35. Crane monitoring control unit 40 is securely mounted within cab portion 52 by conventional means, preferably in close proximity to the crane operator. PC 45 is preferably of the portable type, and as such can be brought into cab portion 52 by qualified personnel and linked to crane monitoring control unit 40 through a serial communication line 58. Although not illustrated in FIG. 3, crane 35 can also include a pair of hydraulically actuated, retractable outriggers connected to crane 35 or bed portion 54 on either side of crane 35. As is known in the art, outriggers are lowered to the ground during stationary crane operations in order to stabilize crane 35 and to relieve the loading forces on running gear 56.

Crane 35 includes a turret assembly 62 with a hydraulic motor and gear drive subassembly (not shown) which is mounted onto a main support structure 64. Turret assembly 62 "slews" or pivotably rotates crane 35 about the vertical axis. Crane 35 also includes a hydraulically actuated, telescoping crane boom generally designated 64. Boom 64 includes a base boom member 64A pivotably connected to turret assembly 62, a telescoping medial boom member 64B, a telescoping distal boom member 64C, and a boom tip 64D. Additional boom members, and extensions such as fly jibs, can also be provided in accordance with known crane design. At least one hydraulically actuated main lift cylinder 66 is connected to base boom member 64A at pivot 66A and to turret assembly 62 at pivot 66B. Main lift cylinder 66 supports boom 64 through a range of "luffing angles," i.e., angles of inclination defined by the longitudinal axis of boom 64 and the horizontal axis. A hydraulically actuated winch assembly 68 mounted at the top of turret assembly 62 houses a winch (not shown) for extension and retraction of a hoist cable 72. The winch includes a drum (not shown) over which hoist cable 72 is wrapped. The barrel of the drum rotates within winch assembly 68 about a drum shaft 75. Hoist cable 72 extends along the length of boom 64, passes over at least one sheave pulley 76 pivotably affixed at boom tip 64D, changes direction at sheave pulley 76, and terminates at a load connection device 78 such as a hook. Winch assembly 68 thus controls the vertical movement of a load 82 attached to hoist cable 72.

The detection of the several loading cases described hereinabove, especially the critical loading cases characterized by dragging and extrication, requires that a variety of sensors be mounted to crane 35 and hardwired to control unit 40. FIG. 3 illustrates a number of the sensors utilized in connection with the present invention. A tip switch 74 is mounted in parallel relation to vertical portion 72A of hoist cable 72 below boom tip 64D. Tip switch 74 is illustrated in more detail in FIG. 4 and described in more detail hereinbelow. Also shown in FIG. 3 is an alarm horn 84, the operation of which will be described hereinbelow. A suitable horn 84 is available from MCM ELECTRONICS as Part No. 82-140, which is a weather-resistant piezo siren producing 120 dB sound pressure level when driven by a 12V input.

A pair of pressure transducers 86 are fitted to main lift cylinder 66 to measure the pressure and pressure changes developed therein during upward and downward movement. Another pair of pressure transducers 88 are installed at the hydraulic lines of turret assembly 62 to measure pressure variations during rotation of turret assembly 62 in the left and right directions, respectively. A pressure transducer 92 can also be installed at the hydraulic feed line of winch assembly 68 used to retract hoist cable 72. Suitable pressure transducers 86, 88 and 92 are available from TELEDYNE as TABER Series 185. A single-axis clinometer 94 can be fitted to boom 64 to measure the luffing angle. A dual-axis clinometer 96 can be installed at main support structure 64 to measure the degree of levelness of crane 35 (i.e., front-rear truck axis and side-side truck axis). A suitable dual-axis clinometer 96 is available from SCHAEVITZ as Part No. 02753-01; a suitable single-axis clinometer is available from SCHAEVITZ as Part No. 0211 xxxx-000. Finally, a boom extension sensor 98 is mounted to base boom member 64A to measure the length of boom 64. Boom extension sensor 98 utilizes a winchable cord 98A for this purpose. Boom extension sensor 98 could also be used to provide power to tip switch 74 and other sensors located at boom tip 64D.

Figure 4:
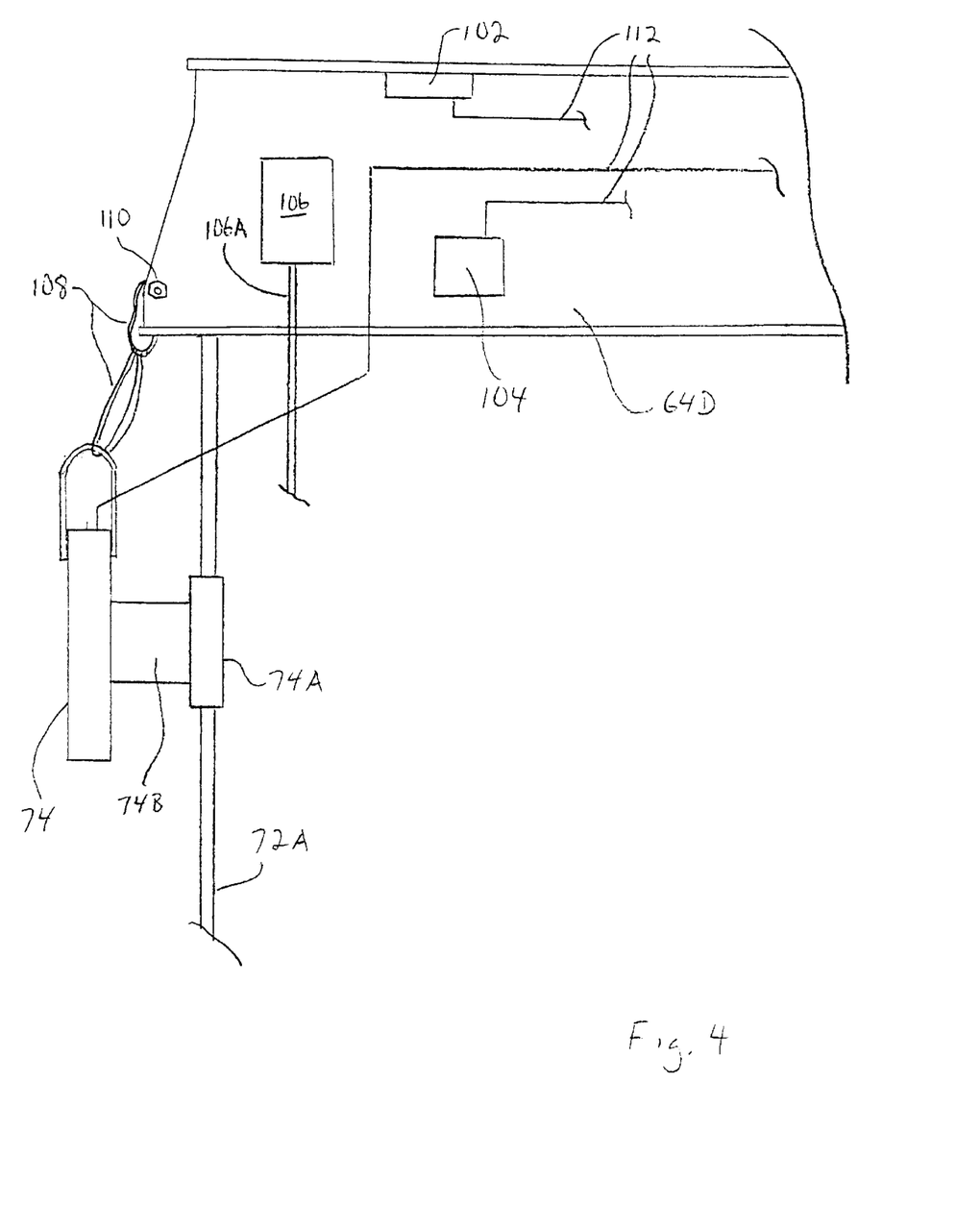
FIG. 4 is a detailed side elevation view of the boom tip area of the crane monitoring system of FIG. 3.

Referring to FIG. 4, two accelerometers 102 and 104 are shown mounted to boom tip 64D perpendicularly to each other. Accelerometer 102 faces downwardly and is principally used to detect acceleration during extrication events, which cause upward and downward bending oscillations in boom 64. Accelerometer 104 is mounted in a vertical orientation and is used to detect acceleration during dragging events, which cause boom 64 to twist and/or accelerate sideways. Suitable accelerometers 102 and 104 are available from IC SENSORS as Model No. 3145-xxx. Accelerometers 102 and 104 are shown in FIG. 4 to be mounted near a conventional anti-two block system switch 106. As is known in the art, an anti-two block system is a safety device designed to prevent winch assembly 68 from pulling on boom 64 itself and consequently bending boom 64. The anti-two block system consists of switch 106 attached through a cable line 106A to a chain (not shown). The chain is attached to a weight (not shown) that embraces vertical portion 72A of hoist cable 72. Whenever load connection device 78 or a loading block associated therewith hits the weight, switch 106 is triggered and winch assembly 68 is deactivated. In view of the fact that anti-two block systems are often provided as standard equipment on modern cranes, boom extension sensor 98 in FIG. 3 could be integrated into the enclosure (not shown) used for the cable reeling system associated with the anti-two block system. This enclosure would normally be provided at the location of boom extension sensor 98 shown in FIG. 3. In such a case, a drum disposed within the enclosure spools cable line to switch 106 as boom 64 extends or retracts. This configuration would provide a platform for the measurement of boom extension by mounting a belt-driven potentiometer to pick up the revolutions of the drum during spooling. Calibration would be set according to the number of revolutions made by the potentiometer from a fully retracted to a fully extended boom position.

Tip switches are conventionally used to control the level of bulk material in silos. Applicants, however, have discovered that tip switch 74 can be used to monitor the angle at which lower portion 72A of hoist cable 72 is operatively inclined with respect to the vertical axis. A suitable tip switch 74 is commercially available from RIEDE SYSTEMS as Model LS-10. For purposes of the present invention, applicants have modified tip switch 74 as shown in FIG. 4. As modified, tip switch 74 is connected to a hollow shaft 74A through an extension plate or plates 74B attachably interposed therebetween. Hoist cable lower portion 72A is allowed to spool freely through hollow shaft 74A. Tip switch 74 is suspended from boom tip 64D in parallel relation to lower portion 72A by conventional means, such as through the use of connection members 108 and nut and bolt assembly 110.

Tip switch 74 is the most direct indicator of load dragging. Tip switch 74 can sense whether hoist cable lower portion 72A is operating at an excessive angle, for example, more than 150 off the vertical axis. Nevertheless, it is only when hoist cable 72 is actually loaded will a dragging event present a hazard to crane 35. Thus, the combination of tip switch 74 and main lift cylinder pressure transducers 86 provides the information necessary to identify a dangerous loading condition effected by dragging. This combination, however, is not capable of indicating whether dragging occurs perpendicular to the plane of boom 64, i.e., the dragging of load B2 in FIG. 2. For this purpose, turret drive pressure transducers 88 are used, since excessive pressure in the hydraulic fluid lines of the motor driving turret assembly 62 is an indication of dragging outside the plane of boom 64. Also, turret drive pressure transducers 88 can serve as a back-up technology in a case where tip switch 74 is not operating properly. In any case, the combination of tip switch 74, main lift cylinder pressure transducers 86 and turret drive pressure transducers 88 provides sufficient means for detecting any type of hazardous dragging event. Vertically mounted accelerometer 104 can also provide useful information regarding a dragging event. Finally, winch drive pressure transducer 92 can be used to detect when the crane operator is dragging load B2 in FIG. 2 by employing winch assembly 68 to wind up hoist cable 72.

On the other hand, an extrication event can be detected through the encoding of signals generated by downwardly facing accelerometer 102 and main lift cylinder pressure transducers 86. Downwardly facing accelerometer 102 can detect the rapid accelerations and decelerations that occur when boom 64 is oscillating upwardly and downwardly. Main lift cylinder pressure transducers 86 can be used to detect cyclic pressure variations in main lift cylinder 66 caused by the oscillation of boom 64. Because the crane operator might initiate an extrication event by using main lift cylinder 66 to rotate boom 64 upwardly, by using winch assembly 68 to wind up hoist cable 72 and thereby pull on the stuck object, or by using a combination of these two techniques, winch drive pressure transducer 88 can also provide useful information regarding the extrication event.

It should be noted that certain values or range of values measured by downwardly facing accelerometer 102, main lift cylinder pressure transducers 86, winch drive pressure transducer 88, or combinations thereof, might indicate other events besides extrication events. These other events could include the snapping of fittings and the breaking of cables. Control unit 40 can be programmed to identify such conditions through recognition of specific oscillation profiles empirically predefined for these other events.

It should also be noted that one or more combinations of signals generated by the above-described sensors can be used to define a critical load condition wherein both dragging and extrication occur during the same lifting operation. One example is a case where load B1 or B2 is intended by the crane operator to be dragged, but must first be extricated from a stuck position as in the case of load C.

It will be understood that all sensors used in connection with crane monitoring system 30 are electrically coupled to appropriate wiring of communication lines, such as lines 112 shown in FIG. 4, to enable signals produced by the sensors to be sent to control unit 40 or other indicators mounted to crane 35 or within cab portion 52.

Figure 5:
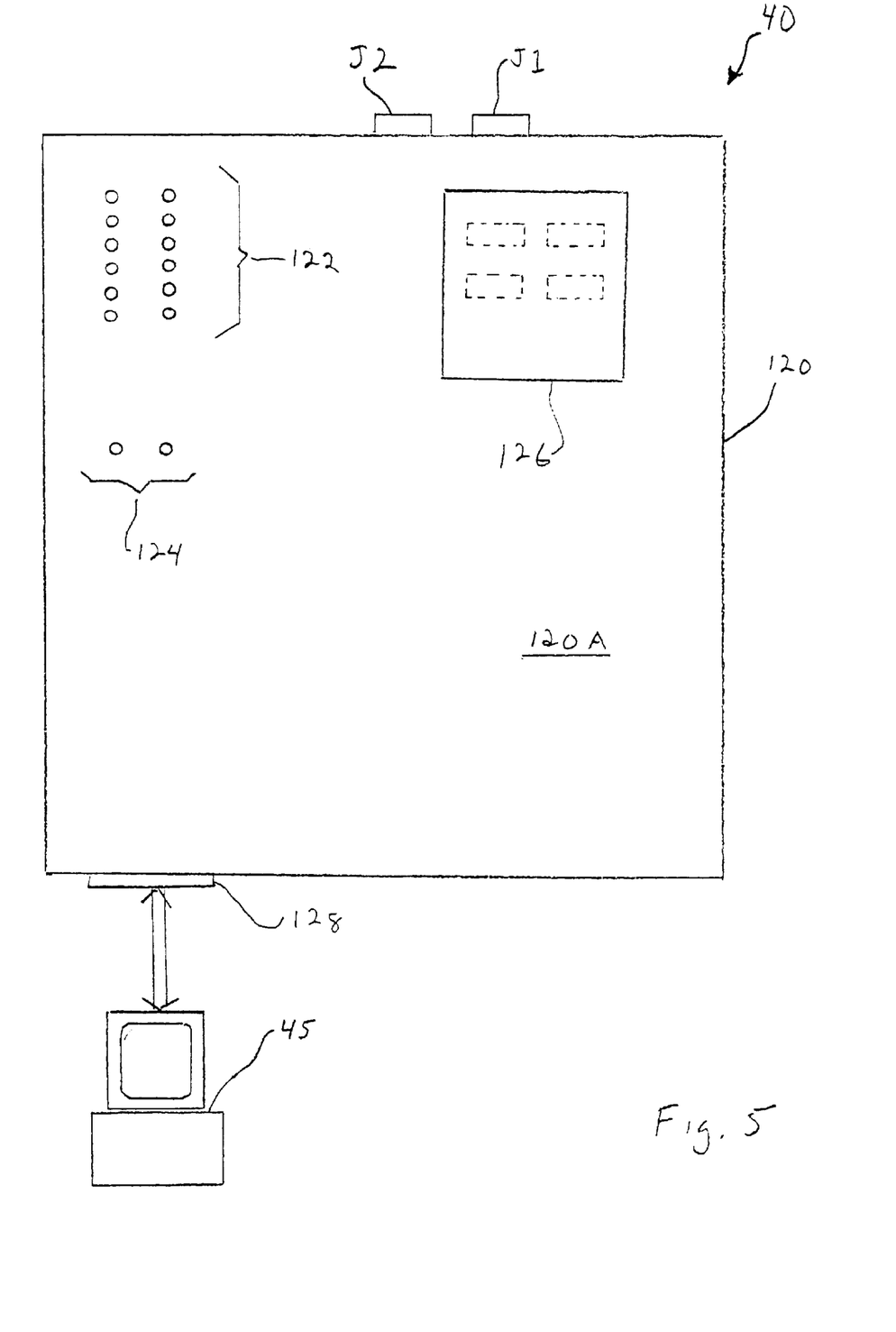
FIG. 5 is a schematic view of a crane monitoring control unit according to the present invention.
Figure 6:
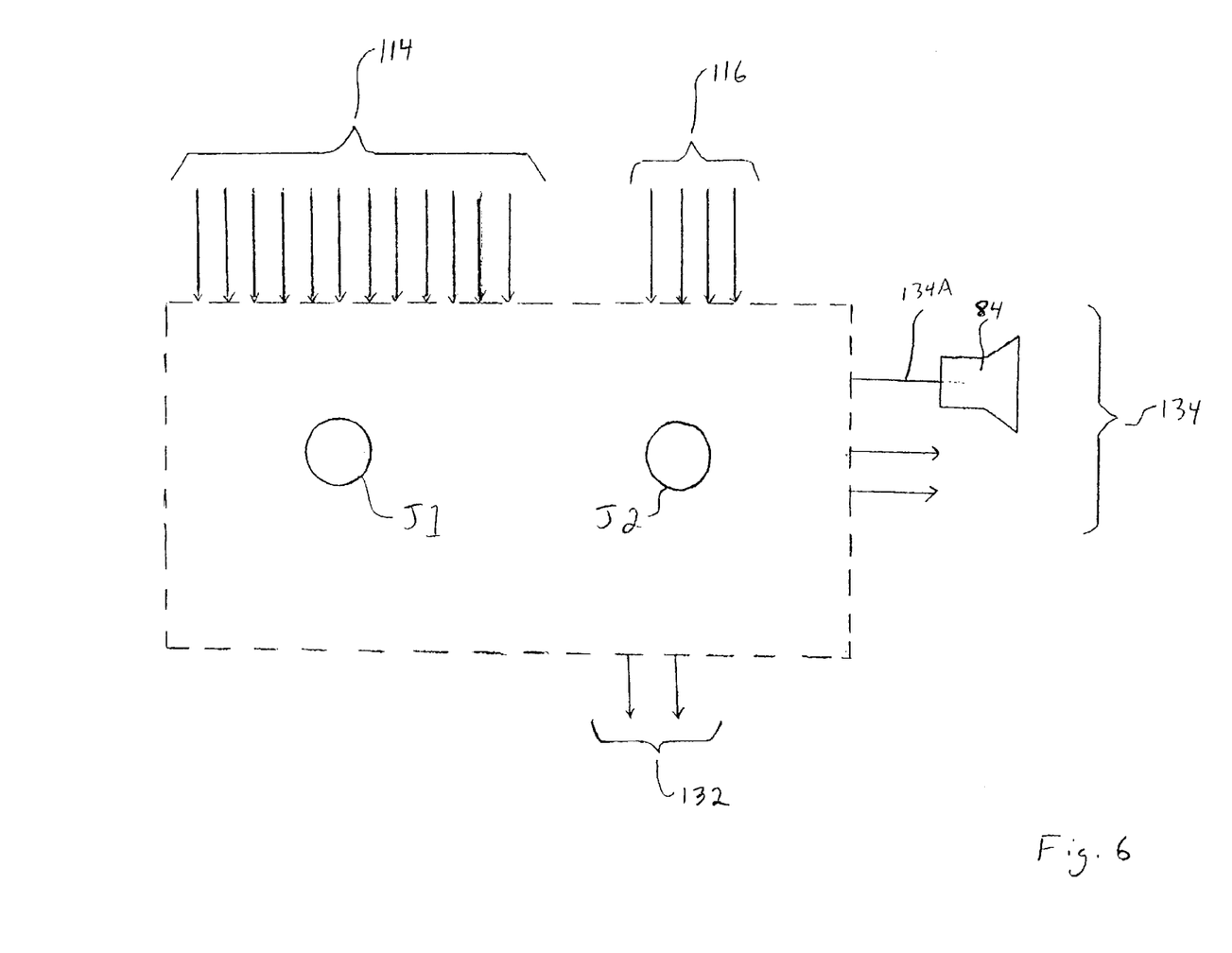
FIG. 6 is a schematic view illustrating inputs and outputs associated with connectors of the control unit of FIG. 5.
Figure 7:
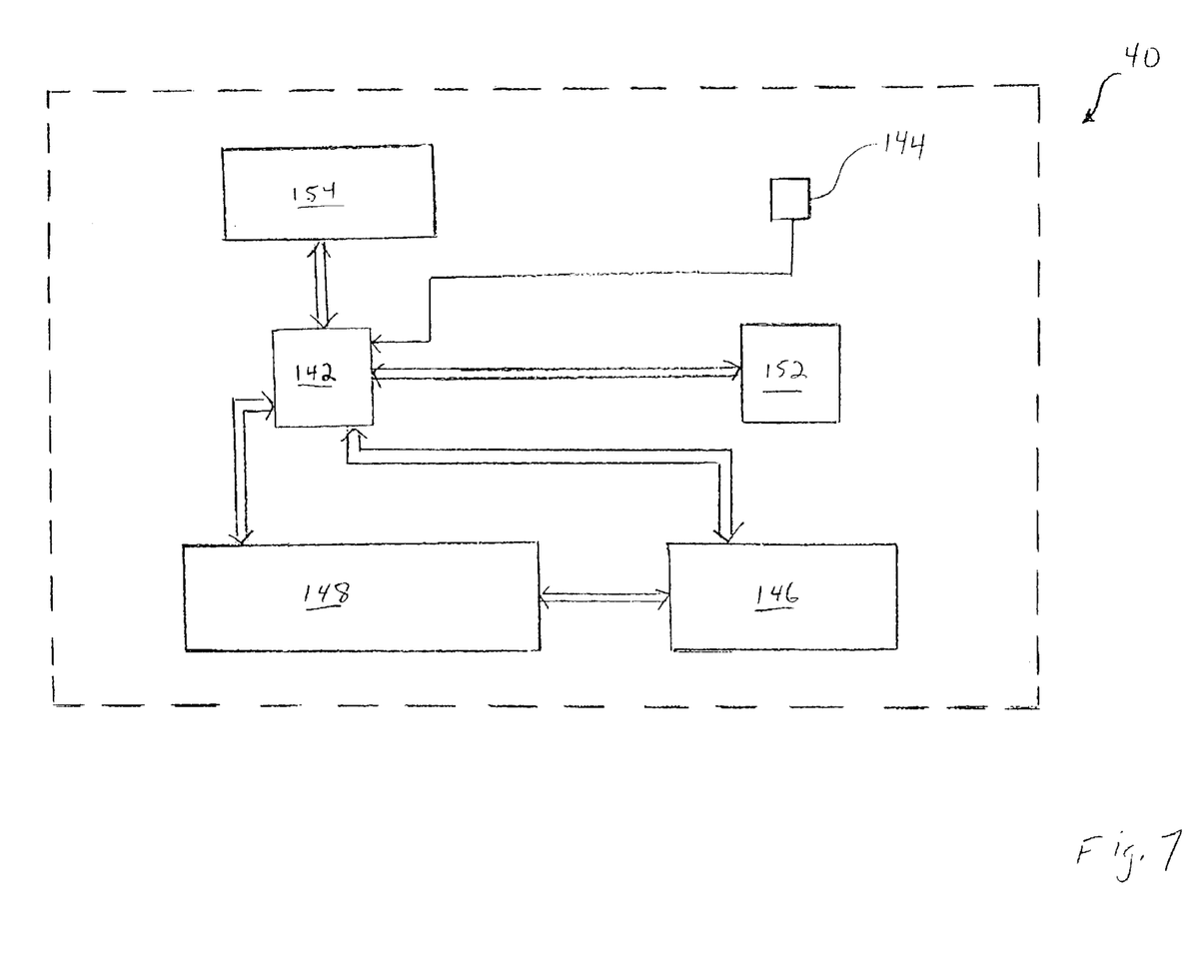
FIG. 7 is a schematic view illustrating the main electronic components of the control unit of FIG. 5.

FIGS. 5–7 generally illustrate the features of a preferred embodiment of crane monitoring control unit 40 and the connections made thereto. Broadly stated, control unit 40 is a microprocessor-based data acquisition system capable of digitizing, interpreting and storing signals received from a plurality of analog input channels 114, and/or interpreting and storing signals received from a plurality of digital input channels 116. These input channels 114 and 116 are ultimately connected to the sensors mounted on crane 35. The broad purpose of control unit 40 is to monitor crane 35 for conditions or stresses which exceed specified limits, sound an alarm when those limits are exceeded, and then create a record of the events surrounding the occurrence of the excessive condition. The event record can be downloaded at a later time by an investigator or other authorized personnel.

Referring to FIG. 5, control unit 40 is housed within a rugged, tamper-proof, weather-resistant enclosure 120 constructed of a high-impact material to provide protection from moisture and shock. A suitable enclosure 120 is available from ROSE as Part No. 01162609 00, which is constructed of aluminum and has external dimensions of 10.25"×6.50"× 3.75". In furtherance of the "black box" functionality of control unit 40, enclosure 120 has a minimal amount of features thereon. Front or top cover 120A of enclosure 120 includes sixteen status indicators in the form of fourteen red light-emitting diodes (or LEDs) 122 and two green LEDs 124. Red LEDs 122 are associated with input channels 114 and 116 (see FIG. 6) and indicate sensor alarm states. Red LEDs 122 can also be used to indicate the state of control unit 40, such as the occurrence of a system failure. One of green LEDs 124 can be used to indicate that power is ON, while the other green LED 124 can be used to indicate that the system is operating such as by flashing at the rate of once per second. A user interface device 126 is mounted on front cover 120A and can be used by authorized personnel to enter various codes, such as an access code to enable the retrieval of data and an override code to shut off horn 84. A suitable interface device 126 is a four-key keypad commercially available from MGR INDUSTRIES as Part No. 2K042103.

Input and output to and from control unit 40 is effected using an RS-232 serial communication link or port 128 and a pair of multi-pin (e.g., 37-pin) metal circular connectors J1 and J2. Serial communication port 128 communicates with PC 45, with settings of 19.2K baud, non-parity, 8 bits, and one-stop bit. A suitable serial communication port 128 is a standard 9-pin D-shell (DB-9) connector, commercially available from AMP as Part No. 747905-2. All other communications to and from control unit 40, including power, sensor inputs, and outputs, are made through connectors J1 and J2. Suitable connectors J1 and J2 are available from AMP as Part Nos. 208471-1 and 208473-1, each with cable clamps designated as Part No. AMP 208945-8. Preferably, connector J1 has male contacts and connector J2 has female contacts in order to prevent accidental reverse connections from being made by a user. Thus, connector J1 has male pins, Part No. AMP 66400-6, and connector J2 has female sockets, Part No. AMP 66399-6. These contacts accommodate wire sizes from 24 AWG to 20 AWG.

Referring to FIG. 6, all input and output connections associated with connectors J1 and J2 are schematically depicted. Connectors J1 and J2 can receive input over the plurality of (e.g., twelve) analog input channels 114 and the plurality of (e.g., four) digital input channels 116. Analog input channels 114 include the following:

(i) two accelerometer inputs (0–0.5V DC), for transferring signals from accelerometers 102 and 104, respectively;

(ii) two dual-axis clinometer inputs (0–5.0V DC), for transferring signals from dual-axis clinometer 96;

(iii) one single-axis clinometer input, for transferring signals from single-axis clinometer 94;

(iv) three pressure differential inputs (0–50 mV DC), for transferring signals from main lift cylinder pressure transducers 86, turret assembly pressures transducers 88, and winch assembly pressure transducer 92, respectively;

(v) one counter input (level set at 0–10V DC); and (vi) three spare inputs (gain selectable at 0–1-V nominal).

Digital input channels 116 include an input channel for transferring signals from tip switch 74 (10V when tip switch is closed and 0V when open) and three spare input channels suitable for connection to other, similarly switched inputs. Additionally, connectors J1 and J2 can send output over a plurality of (e.g., two) analog output channels 132 (0–10V DC at 30 mA max) and a plurality of (e.g., three) digital output channels 134. Analog output channels 132 can be used to link control unit 40 to various peripheral instruments. Digital output channels 134 are of the electromechanical relay type. One digital output channel 134A is used to drive horn 84; the remaining two digital output channels 134 are spares for future applications.

An example of suitable pin assignments for connectors J1 and J2 are given in TABLE 1 below:

TABLE 1

| Connector J1 | | Connector J2 | |
|---|---|---|---|
| Pin No. | Description | Pin No. | Description |
| 1 | PRESSURE XDUCER 1, EXCITATION A | 1 | ANALOG OUTPUT 1, SIGNAL |
| 2 | PRESSURE XDUCER 1, EXCITATION B | 2 | ANALOG OUTPUT 1, RETURN |

TABLE 1-continued

| Connector J1 | | Connector J2 | |
|---|---|---|---|
| Pin No. | Description | Pin No. | Description |
| 3 | PRESSURE XDUCER 1, SIGNAL A | 3 | ANALOG OUTPUT 2, SIGNAL |
| 4 | PRESSURE XDUCER 1, SIGNAL B | 4 | ANALOG OUTPUT 2, RETURN |
| 5 | PRESSURE XDUCER 2, EXCITATION A | 5 | ANALOG COUNTER INPUT, SIGNAL |
| 6 | PRESSURE XDUCER 2, EXCITATION B | 6 | ANALOG COUNTER INPUT, RETURN |
| 7 | PRESSURE XDUCER 2, SIGNAL A | 7 | PRESSURE XDUCER 5, SIGNAL A |
| 8 | PRESSURE XDUCER 2, SIGNAL B | 8 | PRESSURE XDUCER 5, EXCITATION B |
| 9 | SPARE | 9 | DIGITAL SPARE INPUT 1 |
| 10 | PRESSURE XDUCER 3, EXCITATION A | 10 | PRESSURE XDUCER 5, SIGNAL B |
| 11 | PRESSURE XDUCER 3, EXCITATION B | 11 | ANALOG SPARE INPUT 2, RETURN |
| 12 | PRESSURE XDUCER 3, SIGNAL A | 12 | ANALOG SPARE INPUT 3, SIGNAL |
| 13 | PRESSURE XDUCER 3, SIGNAL B | 13 | ANALOG SPARE INPUT 3, RETURN |
| 14 | SINGLE AXIS CLINOMETER, SIGNAL | 14 | DIGITAL SPARE INPUT 2 |
| 15 | SINGLE AXIS CLINOMETER, GND | 15 | DIGITAL SPARE INPUT 3 |
| 16 | DUAL AXIS CLINOMETER 1, +10V | 16 | AVAILABLE +5V |
| 17 | DUAL AXIS CLINOMETER 1, GND | 17 | GND |
| 18 | DUAL AXIS CLINOMETER 1, X OUT | 18 | DIGITAL OUTPUT 2, RELAY CONTACT A |
| 19 | DUAL AXIS CLINOMETER 1, Y OUT | 19 | DIGITAL OUTPUT 1, RELAY CONTACT B |
| 20 | DUAL AXIS CLINOMETER 2, X OUT | 20 | DIGITAL OUTPUT 2, RELAY CONTACT A |
| 21 | DUAL AXIS CLINOMETER 2, Y OUT | 21 | DIGITAL OUTPUT 2, RELAY CONTACT B |
| 22 | SINGLE AXIS CLINOMETER, +10V | 22 | AVAILABLE +5V |
| 23 | ACCELEROMETER 1, +10V | 23 | ANALOG COUNTER, +10V |
| 24 | ACCELEROMETER 1, GND | 24 | GND |
| 25 | ACCELEROMETER 1, SIGNAL | 25 | DIGITAL OUTPUT 3, RELAY CONTACT A |
| 26 | ACCELEROMETER 2, SIGNAL | 26 | DIGITAL OUTPUT 3, RELAY CONTACT B |
| 27 | DUAL AXIS CLINOMETER 2, GND | 27 | TIPSWITCH, NORMALLY OPEN POLE |
| 28 | DUAL AXIS CLINOMETER 2, +10V | 28 | TIPSWITCH, COMMON POLE, +10V |
| 29 | ACCELEROMETER 2, +10V | 29 | SPARE |
| 30 | ACCELEROMETER 2, GND | 30 | GND |
| 31 | PRESSURE XDUCER 4, SIGNAL A | 31 | GND |
| 32 | PRESSURE XDUCER 4, SIGNAL B | 32 | GND |
| 33 | PRESSURE XDUCER 5, EXCITATION A | 33 | POWER, +12V |
| 34 | SPARE | 34 | POWER, +12V |
| 35 | AVAILABLE +10V | 35 | POWER, +12V |
| 36 | SPARE | 36 | POWER, +12V |
| 37 | AVAILABLE +10V | 37 | POWER, +12V |

Referring to FIG. 7, the primary electronic components of control unit 40 will now be described. All electronic components are rated to operate between the standard automotive temperature range between −40 and +85° C., and are contained on a single printed circuit board (not shown) mounted within enclosure 120 using machine screws. Preferably, a power switch for control unit is not provided. The absence of a power switch prevents a crane operator from defeating the operation of control unit 40. Accordingly, power is wired off of an appropriate switched fuse from general vehicle power. As shown in TABLE 1 hereinabove, the required input power is unregulated +12VDC. A reset button (not shown) can be provided if desired, and would be accessible from within enclosure 120 by authorized personnel only for debugging purposes.

The primary electronic components of control unit 40 include digital processing circuitry such as a microprocessor 142, a real-time clock module 144, a RAM unit 146, and a non-volatile memory unit 148. A suitable microprocessor 142 is available from PHILLIPS as Model No. XA 8051.

RAM unit 146 can be 32K×16 static memory to contain volatile data. Preferably, software code designed to operate in the processor platform selected for control unit 40 is embedded in a memory storage device 152. The software code provides a set of instructions to microprocessor 142 for carrying out the various crane monitoring processes and "black box" functionality disclosed herein. Clock module 144 is used to generate current time and date stamps for each "event" stored in non-volatile memory unit 148, which is described in more detail hereinbelow. These stored time and date stamps are included in the data transmitted with the comma delimited spreadsheet that makes up the "event log", also described in more detail hereinbelow. Clock module 144 can be set only by authorized personnel using PC 45 to issue the instruction through serial communication port 128. A suitable clock module 144 is available from DALLAS SEMICONDUCTOR as Part No. DS12887. Non-volatile memory unit 148 preferably contains 2 MB of data storage capability and utilizes flash memory technology. Non-volatile memory unit 148 is used to store alarms and events as described hereinbelow.

In addition, appropriate signal conditioning and sensor data interface circuitry, designated by reference numeral 154, can be provided and configured according to known circuit design principles. For instance, analog-to-digital (A/D) conversion circuitry is needed to process input from analog input channels 114 in digital formats. It is possible, however, for microprocessor 142 to be selected to include a sufficient A/D converter within its circuitry. Also, an amplifier might need to be employed to adjust the signal-to-noise ratio and thereby render irrelevant vibration and other environmental noise sources tending to disturb the sensor readings.

Control unit 40 can be configured to initiate a self-diagnostic procedure on power up. The procedure includes verifying the functionality of RAM unit 146 and non-volatile memory unit 148. In the event of a system failure, a failure code is output to red LEDs 122.

During normal operation of crane 35, control unit 40 continuously receives and samples a data set consisting of the maximum and minimum values of crane condition signals from analog and digital input channels 114 and 116, including any data from the spare analog input digital input channels if utilized, as well as the time and date information generated by clock module 144. The data set is sampled at a rate of not greater than ten samples per second, and time- and date-stamped records or logs of the sampled data sets are stored in non-volatile memory unit 148. The data set is not editable. Microprocessor 142 compares the data set to a set of predetermined parameters, which parameters define safe crane operating conditions and thus the out-of-bounds alarm conditions associated therewith. The set of predetermined safe crane operation parameters can be stored on non-volatile memory unit 148 or a separate internal memory unit if desired. For example, a 512-byte EEPROM operatively mounted on the PC of control unit 40 can contain the system parameters and system data. For each sampled data set, microprocessor 142 determines whether the values of one or more of the crane condition signals exceed the values of one or more of the corresponding safe crane operation parameters. Certain excessive values or a combination of excessive values can define an alarm event and thus a dangerous condition. A binary status byte can be used to indicate the alarm event.

Upon recognition of an alarm event, microprocessor 142 generates a control signal to activate horn 84. Horn 84 can subsequently be silenced by entering an appropriate key combination on user interface device 126. More importantly, the triggering of an alarm event causes microprocessor 142 to automatically dump the data sets surrounding the alarm event into non-volatile memory unit 148 in a permanent and time- and date-stamped record format or "event log" which is distinct and separate from any other data stored in non-volatile memory unit 148. Alternatively, two flash memories could be provided on the PCB of control unit 40. Non-volatile memory unit 148 could be a 1M×16 flash memory for containing the alarms and events. Memory storage device 152 could be a 128K×16 flash memory for containing the embedded software code.

One example of a least a portion of a data set which could form a part of the event log is given in TABLE 2 below:

TABLE 2

The following table outlines the data logging within the unit:

| Logged Data | Size (bytes) | Range/Notes |
| --- | --- | --- |
| Total Unit Run Time | 4 | Up to 130 years (in seconds) |
| Minimum Sensor 1 | 8 | Value and time/date stamp |
| Maximum Sensor 1 | 8 | Value and time/date stamp |
| Minimum Sensor 2 | 8 | Value and time/date stamp |
| Maximum Sensor 2 | 8 | Value and time/date stamp |
| Minimum Sensor 3 | 8 | Value and time/date stamp |
| Maximum Sensor 3 | 8 | Value and time/date stamp |
| Minimum Sensor 4 | 8 | Value and time/date stamp |
| Maximum Sensor 4 | 8 | Value and time/date stamp |
| Minimum Sensor 5 | 8 | Value and time/date stamp |
| Maximum Sensor 5 | 8 | Value and time/date stamp |
| Minimum Sensor 6 | 8 | Value and time/date stamp |
| Maximum Sensor 6 | 8 | Value and time/date stamp |
| Minimum Sensor 7 | 8 | Value and time/date stamp |
| Maximum Sensor 7 | 8 | Value and time/date stamp |
| Minimum Sensor 8 | 8 | Value and time/date stamp |
| Maximum Sensor 8 | 8 | Value and time/date stamp |
| Minimum Sensor 9 | 8 | Value and time/date stamp |
| Maximum Sensor 9 | 8 | Value and time/date stamp |
| Minimum Sensor 10 | 8 | Value and time/date stamp |
| Maximum Sensor 10 | 8 | Value and time/date stamp |
| Minimum Sensor 11 | 8 | Value and time/date stamp |
| Maximum Sensor 11 | 8 | Value and time/date stamp |
| Minimum Sensor 12 | 8 | Value and time/date stamp |
| Maximum Sensor 12 | 8 | Value and time/date stamp |
| Minimum Sensor 13 | 8 | Value and time/date stamp |
| Maximum Sensor 13 | 8 | Value and time/date stamp |
| Minimum Sensor 14 | 8 | Value and time/date stamp |
| Maximum Sensor 14 | 8 | Value and time/date stamp |
| Minimum Sensor 15 | 8 | Value and time/date stamp |
| Maximum Sensor 15 | 8 | Value and time/date stamp |
| Minimum Sensor 16 | 8 | Value and time/date stamp |
| Maximum Sensor 16 | 8 | Value and time/date stamp |
| Boom Zero Position | 4 | Nearest foot and inch |
| Boom Full Position | 4 | Nearest foot and inch |
| Boom Angle Offset | 4 | Nearest tenth degree |
| Bore Diameter | 2 | Nearest inch |
| Rod Diameter | 2 | Nearest inch |
| Reference Angle | 4 | Nearest tenth degree |
| Offset Angle Weight Calibration | 4 | Nearest tenth degree |
| Load Limit Coefficient A | 4 | Real Number |
| Load Limit Coefficient B | 4 | Real Number |
| Load Limit Coefficient C | 4 | Real Number |
| Load Limit Coefficient D | 4 | Real Number |
| Spare | 48 | |
| Max Total: 340 | | |

In order to optimize later analysis of the alarm event by investigators, the event log consists of data sets sampled over a range of time corresponding to a period of event history. The period of event history is defined as starting from a predetermined time before the occurrence of the alarm event and ending at a predetermined time after microprocessor 142 has detected that the alarm event has concluded. Preferably, the microprocessor 142 is programmed to define the event log as starting at ten seconds before the commencement of the alarm event and ending at ten to thirty seconds after the conclusion of the alarm event. Hence, upon the occurrence of an alarm event and instantaneous detection thereof by microprocessor 142, microprocessor 142 immediately begins to generate the discrete event log by (i) writing all data sampled during the prior ten-second period, (ii) continuously storing all subsequent data as long as the alarm event is detected, and (iii) proceeding to store the input data for thirty seconds after the point in time at which microprocessor 142 determined that the alarm event cleared.

Because the data sets recorded in the event log include time and date stamps, the investigator can identify the crane operator who caused the alarm event to occur and what the operator did to trigger the alarm event. The investigator can also determine the duration of the alarm event and the respective durations of the various crane conditions leading up to, during, and following the alarm event. In addition, the values of these crane conditions, such as those representing turret and main lift cylinder pressure differentials, can be plotted against time and used for further analysis.

It should be noted that non-volatile memory unit 148 has a finite storage capacity. Thus, the oldest stored data sets are automatically erased (i.e., non-volatile memory is constantly being rolled over) to make room for newly sampled data sets when control unit 40 senses that non-volatile memory unit 148 is filled. This is not a problem, because the investigator will not be concerned with crane conditions occurring during normal events of crane operation, but rather will be interested only in studying the dangerous conditions which defined the alarm event and formed a part of the event history.

While a variety of dangerous conditions can be recorded by control unit 40, the present invention is particularly directed to monitoring the dragging and extrication events described hereinabove. The dragging event is generally defined when tip switch 74 becomes active while there is strain on hoist cable 72. As described hereinabove, strain on hoist cable 72 is indicated when either main lift cylinder 66 or the drive of turret assembly 62 experiences pressure variations of predetermined values. The extrication event is generally defined when accelerometer 102 senses oscillations of predetermined values, or when the slope of the differential pressure experienced by main lift cylinder 66 or winch assembly 68 versus time drops from near unity to below a predetermined threshold value. In either the dragging or extrication modes, the ten seconds of input data sampled before the beginning of the alarm event and the thirty seconds following the alarm event will be recorded in an event log residing in non-volatile memory unit 148. After the thirty second period, when the inputs no longer indicate an alarm event, one final measurement will be taken to mark the end of the alarm event.

In the case of a dragging event, which can proceed for an indefinite amount of time, a second dragging event cannot be recorded until the first alarm event is no longer applicable. In other words, the act by the operator of leaving crane 35 in a violating state will not record multiple dragging events. On the other hand, an extrication event is by nature a short-lived, discrete event. Activation of horn 84 also varies for the two events. In the case of a dragging event, horn 84 will be activated as soon as the dragging event is detected. Horn 84 can then be deactivated either by a supervisor or other authorized personnel keying in a horn override code at user interface device 126 or by the crane operator ceasing the dragging operation. In the case of an extrication alarm, horn 84 will be activated for a discrete period of time such as thirty seconds. The respective lengths of time during which data sets are stored into an event log and during which horn 84 is sounded are determined according to entirely separate processes.

Another useful feature of crane monitoring system 30 is the ability of control unit 40 to download the event log from non-volatile memory unit 148 to PC 45 via serial communication port 128. This feature eliminates the need to remove control unit 40 from crane 35 or to provide control unit 40 with an excessive number of input/output interfaces and peripheral devices. After the occurrence of an alarm event, a supervisor, investigator or other authorized user can bring PC 45 into cab portion 52 of crane 35 and create a communication link with control unit 40 by connecting serial communication line 58 to serial communication port 128 (see FIG. 3). As an additional security measure, microprocessor 142 of control unit 40 can be programmed to enable access of the data stored in non-volatile memory unit 148 and downloading of the event log into PC 45 only after an appropriate access code has been input at user interface device 126 on front cover 120A of control unit 40.

PC 45 is preferably of the portable or notebook computer type. It is also preferable that PC 45 be equipped with its own operating system and local memory. It is further preferable that the operating system have a graphical user interface (GUI) which can access from local memory a software application designed to interface with control unit 40. By using this interfacing software application, the user can issue instructions to upload the event log from control unit 40 into the local memory of PC 45. Preferably, microprocessor 142 of control unit 40 is programmed to clear non-volatile memory unit 148 once the event log has been safely transferred to the local memory of PC 45. In order to facilitate the analysis to be performed by the user, the data from the event log can be recorded into the local memory as a ".CSV" file so that it can be directly imported into any common spreadsheet program loaded on PC 45 (for example, MICROSOFT EXCEL®). The event log can also be imported to computer programs specifically designed to assist in failure analysis. One example are programs employing pattern recognition techniques to assist in identifying features that determine specific loading conditions.

It should be noted that many of the parameters utilized by control unit 40 to detect the occurrence of an alarm event will depend upon the type of crane in which crane monitoring system 30 is implemented, the particular make and model of the crane type and, for a given type and model of crane, the particular set-up and auxiliary operating components used. For such variations, the number and types of sensors mounted to the crane can change, the locations of those sensors can change, and the values for safe crane operating conditions can change. Accordingly, it is expected that different sets of safe crane operation parameters will need to be defined to account for these variations. Thus, PC 45 can be used to load the parameter set into control unit 40 appropriate for the particular crane in which control unit 40 is mounted.

The particular crane type and configuration will also dictate the calibration procedures necessary to ensure the accurate operation of control unit 40 and the various sensors providing input thereto. For instance, boom extension sensor 98 is essentially a rotary encoder and must be calibrated to cord 98A that runs in and out with boom 64. This calibration is a linear ($I=ax+b$) relationship. The user of PC 45 can initiate a boom length calibrator program. Boom 64 is retracted completely, the length from the pivot point of boom 64 to the furthest point of cord 98A is measured, and this measurement is entered on PC 45. Boom 64 is then extended completely, the length from the pivot point of boom 64 to the furthest point of cord 98A is again measured, and this new measurement is entered on PC 45. The boom length calibrator program will calculate the "a" and "b" factors for the boom length calibration equation and upload that data to control unit 40.

In addition, single-axis clinometer 94 might not be level and thus should be calibrated in order to give accurate reading of boom angle. An offset angle can be calculated to compensate for a non-level single-axis clinometer 94. For this purpose, a boom angle calibrator program can be provided on PC 45. After starting the boom angle calibrator program, an accurate level such as a digital, non-bubble device is employed to find the perfectly level position of boom 64. At this point, the program takes a measurement, interrogates control unit 40 for what level at which control unit 40 determines boom 64 to be positioned, and uploads the difference as the offset boom angle.

Once the above calibrations are complete, a weight equation can be calculated using a weight equation calibrator program provided on PC 45. Parameters entered into the program include bore diameter, rod diameter, reference angle, offset angle, boom length "a" and boom length "b". Control unit 40, however, will not be able to read correct measurement until a boom sectioning calibration procedure is performed. Boom sectioning calibration is accomplished by extend boom 64 with no load, stopping where each boom joint begins to move out, and using the main lift cylinder pressures to determine the weight of boom 64. The weight effect should be linear within the movement of each boom joint. At this point, crane 35 should be able to lift objects and report the weight of those objects. Finally, a load limit calibration can be conducted by entering the load limits for various points on a graph entered into a program provided on PC 45. From these points, load limit coefficients will be generated for use by control unit 40.

It will be understood that various details of the invention may be changed without departing from the scope of the invention. Furthermore, the foregoing description is for the purpose of illustration only, and not for the purpose of limitation the invention being defined by the claims.

What is claimed is:

1. A method for monitoring critical operations of a crane, and for safely and automatically storing records of alarm events arising from such operations, comprising the steps of:
   (a) providing a plurality of input channels over which crane condition signals can be transferred from a plurality of sensors mounted to a crane, each crane condition signal generated by one of the sensors and including a value representative of a specific measurement or condition of the crane during operation thereof;
   (b) continuously sampling a data set at a predetermined sampling rate during operation of the crane by commmunicating with the input channels, each sampled data set including the value detected for each crane condition signal at the time of sampling and also including time and date information corresponding to the respective time and date of sampling, wherein the time of sampling substantially corresponds to the time at which the crane condition occurred;
   (c) storing each data set sampled into a non-volatile memory device;
   (d) for each data set sampled, comparing the values of the crane condition signals to a set of predetermined safe operating parameters to determine whether an alarm event has occurred, the alarm event defined when one or more of the values of the sampled crane condition signals falls outside a corresponding one or more of the safe operating parameters;
   (e) if an alarm event has occurred, comparing the values of the crane condition signals to the safe operating parameters to determine whether the alarm event has ceased, the cessation of the alarm event defined when one or more of the values of the sampled crane condition signals falls back inside a corresponding one or more of the safe operating parameters; and
   (f) if an alarm event has occurred, generating an event log for the alarm event by storing, into a separately addressed location of the non-volatile memory device, all data sets sampled over a period of event history, the period of event history defined as starting at a predetermined number of seconds prior to the occurrence of the alarm event and ending at a predetermined number of seconds after the cessation of the alarm event.

2. The method according to claim 1 wherein the data set is sampled at a sampling rate equal to or less than 10 seconds per sample.

3. The method according to claim 1 further comprising the step of defining the event history as a period of time starting at 10 seconds prior to the occurrence of the alarm event and ending at 10 to 30 seconds after the cessation of the alarm event.

4. The method according to claim 1 further comprising the step of activating an audible alarm output to indicate the occurrence of the alarm event.

5. The method according to claim 1 further comprising the step of downloading the generated event log into a remote storage medium.

6. The method according to claim 5 further comprising the step of transporting the remote storage medium containing the stored event log away from the crane.

7. A method for monitoring critical operations of a crane, and for safely and automatically storing records of alarm events arising from such operations, comprising:
   (a) mounting a plurality of sensors to a crane, each sensor adapted to measure or detect a specific operating condition of the crane, and each sensor adapted to generate an electrical crane condition signal including a value representative of the operating condition measured or detected by that sensor;
   (b) mounting a control unit to the crane;
   (c) providing control circuitry within the control unit and a plurality of input channels to establish communication from the sensors to the control circuitry; and
   (d) programming the control circuitry to perform the following functions:
      (i) during operation of the crane, monitoring the input channels by continuously sampling a data set at a predetermined sampling rate during operation of the crane by communicating with the input channels, each sampled data set including the value detected for each crane condition signal at the time of sampling and also including time and date information corresponding to the respective time and date of sampling, wherein the time of sampling substantially corresponds to the time at which the crane condition occurred;
      (ii) storing each data set sampled into a non-volatile memory device;
      (iii) for each data set sampled, comparing the values of the crane condition signals to a set of predetermined safe operating parameters to determine whether an alarm event has occurred, the alarm event defined when one or more of the values of the sampled crane condition signals falls outside a corresponding one or more of the safe operating parameters;

(iv) if an alarm event has occurred, comparing the values of the crane condition signals to the safe operating parameters to determine whether the alarm event has ceased, the cessation of the alarm event defined when one or more of the values of the sampled crane condition signals falls back inside a corresponding one or more of the safe operating parameters; and (v) if an alarm event has occurred, generating an event log for the alarm event by storing, into a separately addressed location of the non-volatile memory device, all data sets sampled over a period of event history, the period of event history defined as starting at a predetermined number of seconds prior to the occurrence of the alarm event and ending at a predetermined number of seconds after the cessation of the alarm event.

8. The method according to claim 7 further comprising the step of defining the event history as a period of time starting a 10 seconds prior to the occurrence of the alarm event and ending at 30 seconds after the cessation of the alarm event.

9. The method according to claim 7 further comprising the steps of establishing a communication link between the control unit and a computer disposed externally with respect to the control unit, and downloading the generated event log from non-volatile memory of control unit to the computer.

10. The method according to claim 7 further comprising the steps of establishing a communication link between the control unit and a computer disposed externally with respect to the control unit, and using the computer to assist in calibrating the control unit and sensors.

11. A crane monitoring system comprising:

(a) a plurality of sensors operatively mounted to a crane and adapted to monitor a plurality of operating conditions of the crane, each sensor operative to generate an electrical crane condition signal representative of one of the monitored crane operating conditions and to send the crane condition signal over a communication line;

(b) a crane monitoring control unit mounted to the crane;

(c) a non-volatile memory unit operatively disposed within the control unit; and (d) digital processing circuitry operatively disposed within the control unit and communicating with the non-volatile memory unit, the digital processing circuitry adapted to execute a set of crane monitoring instructions, the crane monitoring instructions including:

(i) continuously sampling a data set at a predetermined sample rate and writing the sampled data set into the non-volatile memory, the data set including the respective crane condition signals generated by the sensors and sent over the respective communication lines associated with the sensors, the data set also including time and date information provided by the control unit and corresponding to the respective time and date of receipt of the crane condition signals by the digital processing circuitry;

(ii) for each data set sampled, comparing the crane condition signals to a set of predetermined safe operating parameters and detecting the occurrence and subsequent cessation of an alarm event, the alarm event defined when one or more of the sampled crane condition signals exceeds a corresponding one or more of the safe operating parameters; and (ii) upon detection of an alarm event, generating a discrete event log and writing the event log into the non-volatile memory, the event log including a series of data sets sampled over a period of event history, the period of event history defined as starting at a predetermined number of seconds prior to the occurrence of the alarm event and ending at a predetermined number of seconds after the cessation of the alarm event.

12. The crane monitoring system according to claim 11 further comprising an audible alarm device adapted to receive an activating output signal from the digital processing circuitry upon detection of the alarm event.

13. The crane monitoring system according to claim 11 wherein the plurality of sensors includes a tip switch.

14. The crane monitoring system according to claim 11 wherein the plurality of sensors includes a pair of main lift cylinder pressure transducers.

15. The crane monitoring system according to claim 11 wherein the plurality of sensors includes a pair of turret drive pressure transducers.

16. The crane monitoring system according to claim 11 wherein the plurality of sensors includes a winch drive pressure transducer.

17. The crane monitoring system according to claim 11 wherein the plurality of sensors includes a winch drive pressure transducer.

18. The crane monitoring system according to claim 11 wherein the plurality of sensors includes an accelerometer.

19. The crane monitoring system according to claim 11 wherein the control unit includes a clock module adapted to provide the time and date information included in each data set.

20. The crane monitoring system according to claim 11 further comprising computer code embedded within a computer code storage device, the computer code storage device disposed within the control unit and communicating with the digital processing circuitry, the computer code providing the set of crane monitoring instructions executed by the digital processing circuitry.

21. The crane monitoring system according to claim 20 wherein the digital processing circuitry includes a microprocessor adapted for interfacing with the computer code storage device and for processing the set of crane monitoring instructions provided by the computer code.

22. The crane monitoring system according to claim 11 further comprising a portable computing device communicating with the control unit, the portable computing device including a portable computing device memory unit and interface code, the interface code adapted to provide access to the event log and downloading of the event log to the portable computing device memory.

23. The crane monitoring system according to claim 22 further comprising a user interface device mounted to the control unit and adapted to permit communication between the control unit and the portable computing device.

24. A crane equipped with a crane data acquisition system comprising:

(a) a crane support section including a plurality of operative crane components mounted thereto, the plurality of operative crane components including:

(i) a hydraulically actuated turret assembly rotatable about a vertical axis;

(ii) a boom assembly pivotably mounted to the turret assembly and rotatable about a horizontal axis, the boom assembly including a boom tip disposed at a distal end of the boom assembly;

(iii) a hydraulically actuated main lift cylinder pivotably interconnected between the crane support section and the boom assembly;
(iv) a winch assembly; and
(v) a cable windable about a drum within winch assembly, the cable extending along the length of the boom assembly and downwardly toward the ground below the boom tip;

(b) a crane operator section adapted for use by a crane operator;

(c) a plurality of sensors operatively mounted to a crane and adapted to monitor a plurality of operating conditions of the crane, each sensor operative to generate an electrical crane condition signal representative of one of the monitored crane operating conditions and to send the crane condition signal over a communication line, the plurality of sensors including:
(i) a tip switch mounted proximate to the boom tip and suspended therefrom in parallel relation to the cable, the tip switch adapted to detect whether the cable is operating at an excessive angle of inclination;
(ii) a pair of main lift cylinder pressure transducers operatively mounted to the main lift cylinder and adapted to measure hydraulic pressure variations experienced by the main lift cylinder;
(iii) a pair of turret drive pressure transducers operatively mounted to the turret assembly and adapted to measure hydraulic pressure developed by the turret assembly during respective left and right rotations of the turret assembly; and
(iv) an accelerometer operatively mounted to the boom assembly and adapted to measure accelerations and decelerations experienced by the boom assembly;

(d) a crane monitoring control unit mounted to the crane operator section and communicating with the plurality of sensors, the crane monitoring control unit including digital processing circuitry for sampling and processing the crane condition signals, identifying the occurrence of an unsafe crane condition based on a comparison of the crane condition signals against predetermined safe operating parameters, and generating and storing an event log indicative of crane operations causing the unsafe crane condition, the event log including all crane condition signals sampled over a period of time starting at a predetermined number of seconds preceding the occurrence of the unsafe crane condition and ending at a predetermined number of seconds after a conclusion of the unsafe crane condition.

* * * * *